FIG. I

INVENTORS
Nickolas Gold
and
Arthur J. Sable
BY
Brown and Mikulka
and
Robert E. Cook
ATTORNEYS

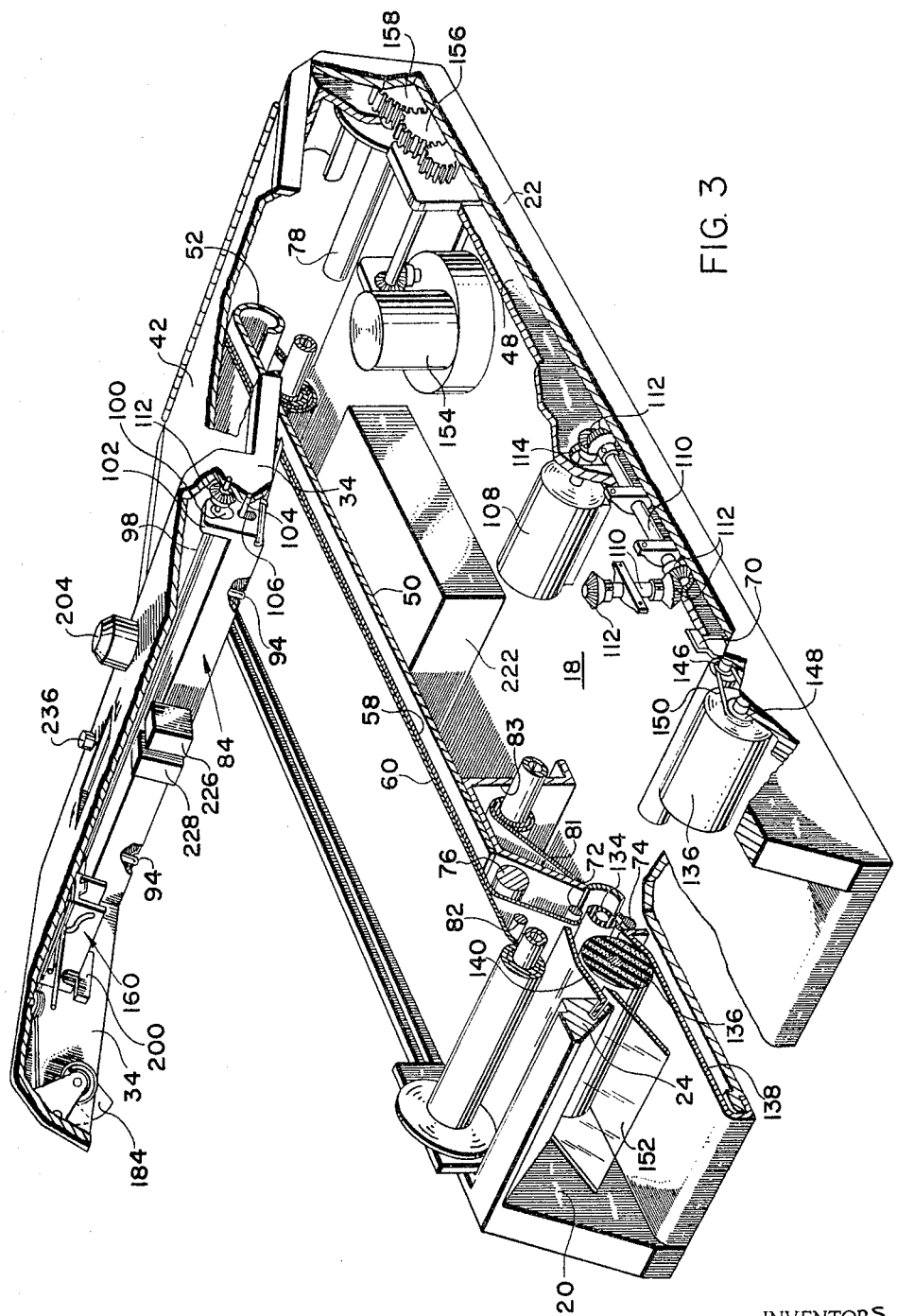

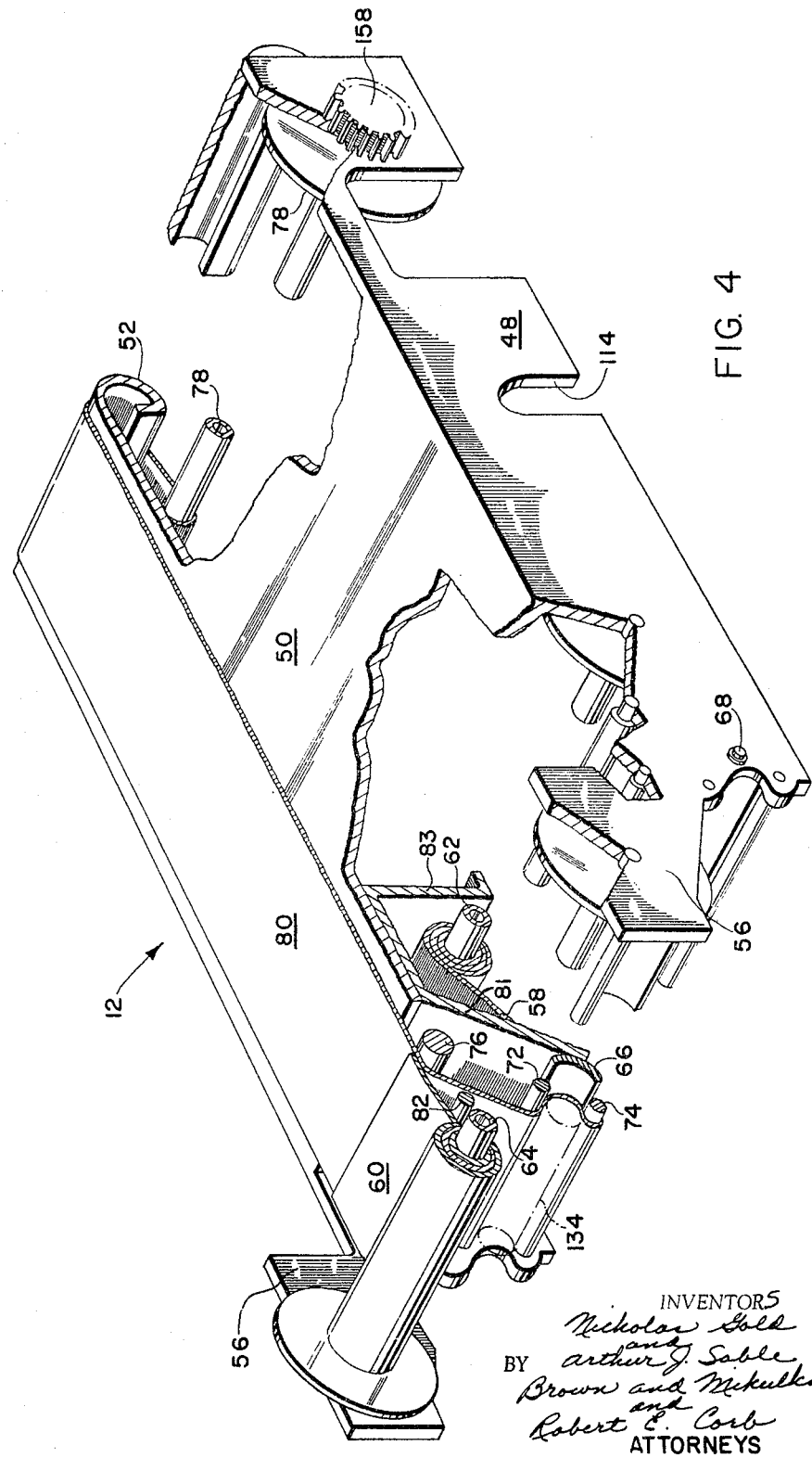

Nov. 8, 1966   N. GOLD ETAL   3,283,688
PHOTOGRAPHIC APPARATUS
Filed June 3, 1964   8 Sheets-Sheet 5
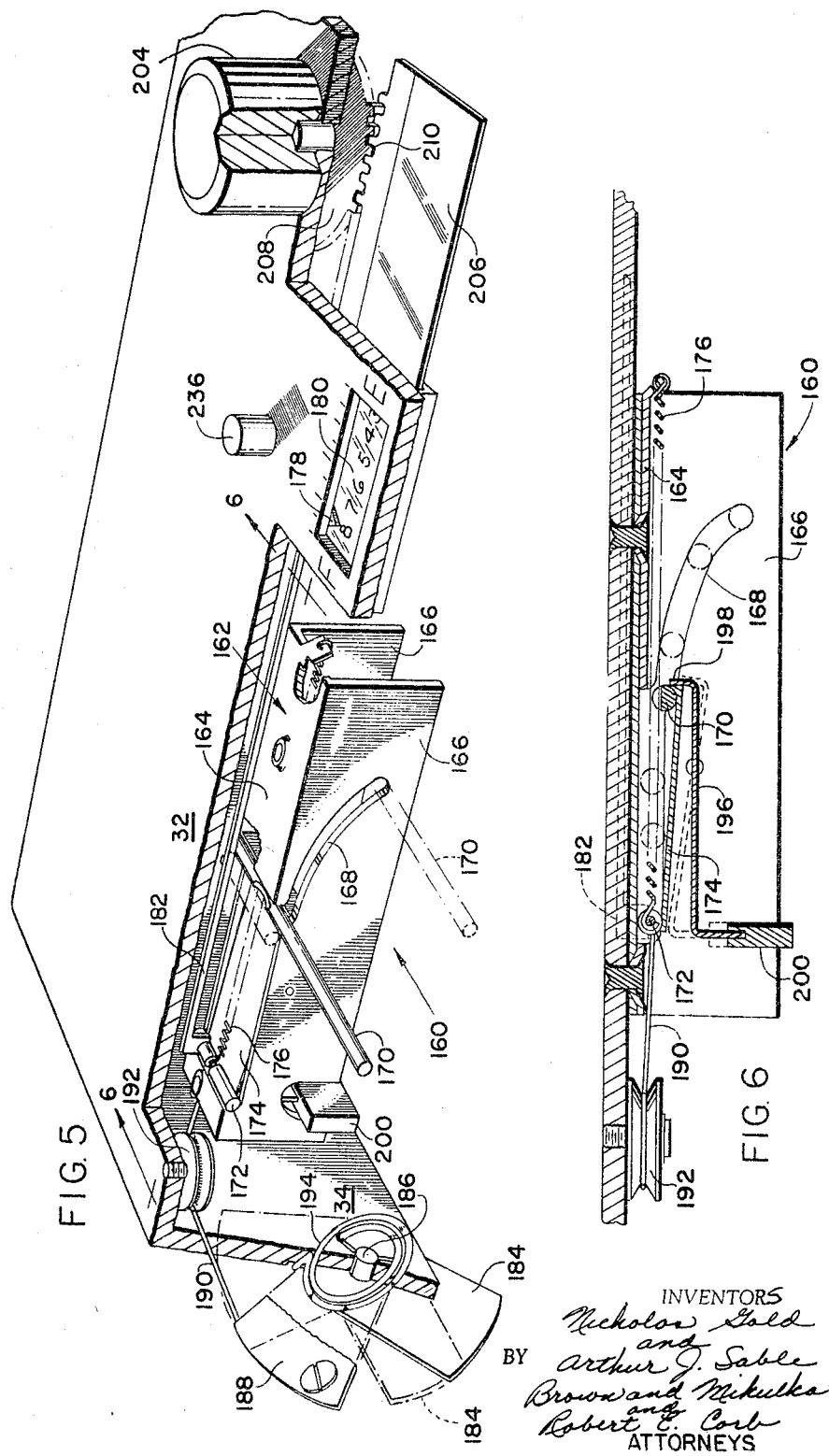
INVENTORS
Nicholas Gold
and
Arthur J. Sable
BY
Brown and Mikulka
and
Robert E. Corb
ATTORNEYS Nov. 8, 1966 N. GOLD ETAL 3,283,688
PHOTOGRAPHIC APPARATUS
Filed June 3, 1964 8 Sheets-Sheet 7

INVENTORS
Nicholas Gold
and
Arthur J. Sable
BY Brown and Mikulka
and
Robert E. Corb
ATTORNEYS Nov. 8, 1966 N. GOLD ETAL 3,283,688
PHOTOGRAPHIC APPARATUS
Filed June 3, 1964 8 Sheets-Sheet 8

INVENTORS
Nicholas Gold
and
BY Arthur J. Sable
Brown and Mikulka
and
Robert E. Corb
ATTORNEYS

Header omitted 3,283,688
PHOTOGRAPHIC APPARATUS
Nicholas Gold, Arlington, Mass., and Arthur J. Sable, Saratoga, Calif., assignors to Polaroid Corporation, Cambridge, Mass., a corporation of Delaware
Filed June 3, 1964, Ser. No. 372,149
10 Claims. (Cl. 95—75)

This invention relates to photographic apparatus and particularly to apparatus for exposing successive areas of a photosensitive image-recording sheet and processing said areas by superposing them with areas of a second sheet and distributing a processing liquid between and in contact with the superposed sheets.

The present invention may be embodied in photographic apparatus of a known type such as a camera or document copier including means for photoexposing successive areas of an image-recording sheet, advancing each exposed area into superposition with a second sheet and distributing a processing liquid between the sheets to form a sandwich. The sheets are superposed and the processing liquid is distributed therebetween by moving the sheets into and through a convergent passage between a pair of juxtaposed pressure-applying members to distribute the liquid from a mass located between convergent portions of the sheets within the passage in contact with the sheets as the sheets move relative to the mass of liquid and the pressure-applying members. Movement of the sheets is arrested at the end of each exposure and processing cycle during which an area of the image-recording sheet is exposed and then processed in conjunction with an area of the second sheet. Apparatus of this type generally includes means for collecting and retaining processing liquid remaining between the sheets within the passage after the liquid has been distributed in contact with the areas to be treated so that the liquid is not distributed in contact with the next succeeding pair of areas. This can be accomplished by spacing the pressure-applying members apart from one another momentarily during the terminal portion of the processing cycle as sections of the sheets intermediate the areas being processed are moving between the pressure-applying members.

An object of the invention is to provide in apparatus of the character described novel and improved means for controlling the movement of the sheets through the apparatus and then spacing the pressure-applying members apart to collect and retain processing liquid between predetermined portions of the sheets.

Other objects of the invention are: to provide photographic apparatus as described for use with sheet material having reference openings therein and including drive means for advancing the sheets through the apparatus between the pressure-applying members and spacing the pressure-applying members apart and means for sensing the reference openings to control the operation of the drive means; and to provide sensing means mounted on one of the pressure-applying members for controlling the movement of the sheets between the pressure-applying members and movement of the one pressure-applying member toward and away from the other pressure-applying member.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

FIG. 3 is a fragmentary perspective view of the apparatus shown with parts broken away;

FIG. 4 is a fragmentary perspective view of the expendable assemblage;

FIG. 5 is a fragmentary perspective view of a portion of the nonexpendable assemblage;

FIG. 6 is a sectional view taken substantially along the line 6—6 of FIG. 5;

Figure 1:
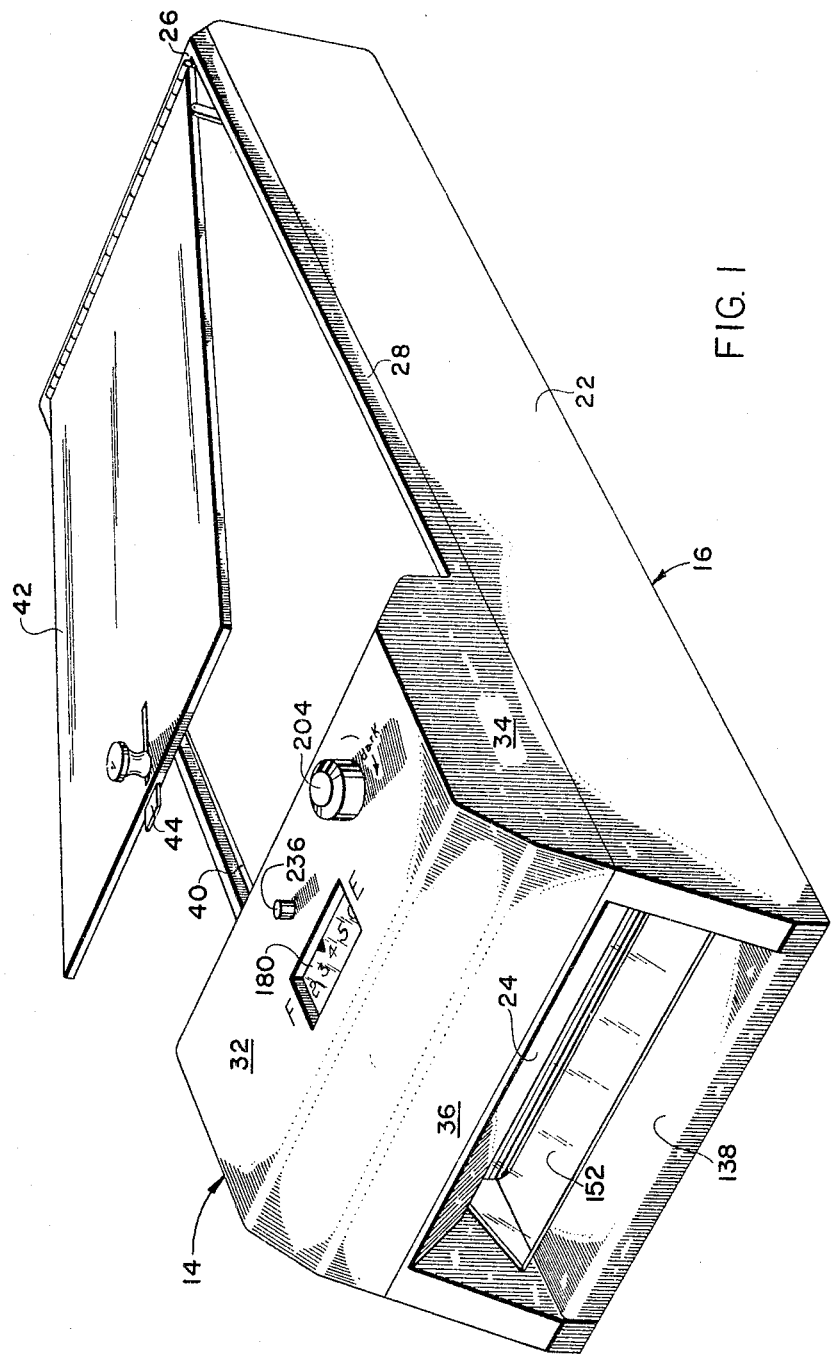
FIGURE 1 is a perspective view of document-copying apparatus embodying the invention.
Figure 2:
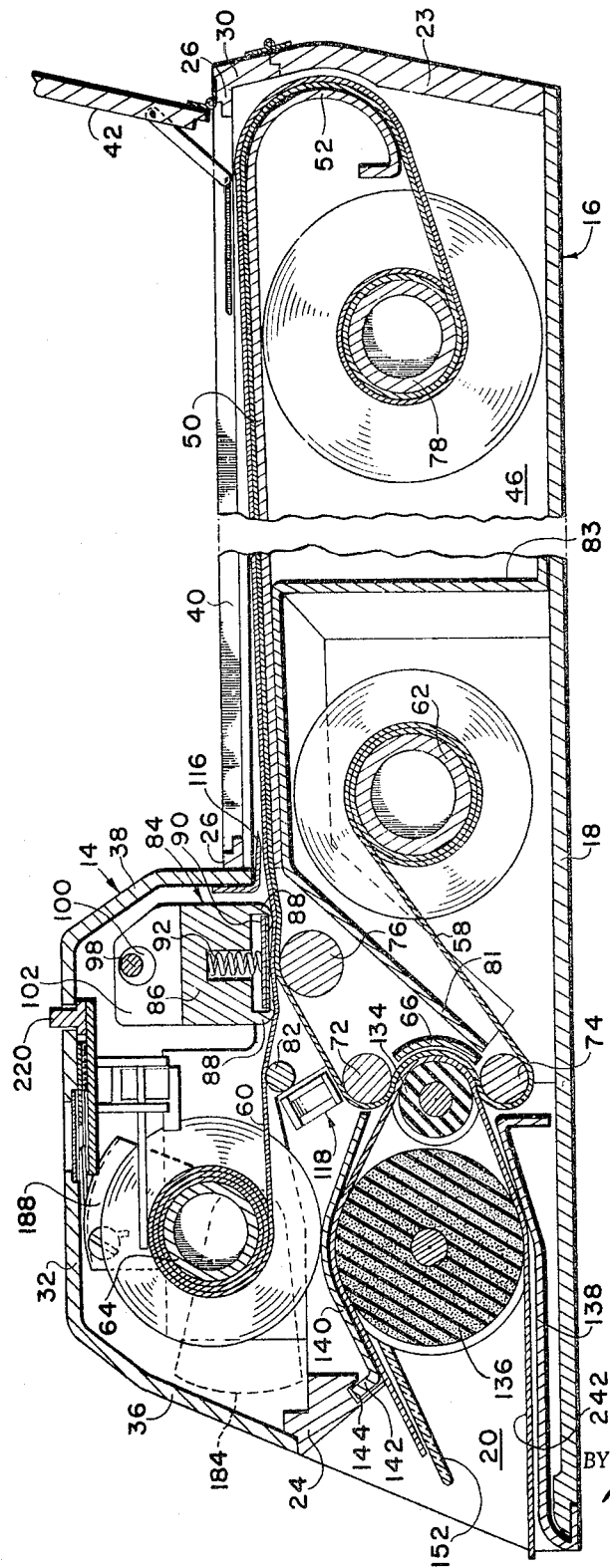
FIG. 2 is an elevational sectional view of the apparatus, the section being taken substantially midway between the sides.

The present invention is shown embodied in photographic document-copying apparatus comprising a permanent or nonexpendable photographic assemblage shown in FIGS. 1 through 3, and an expendable photographic assemblage, designated 12, shown in FIGS. 1 through 4. The permanent assemblage includes a housing and the more expensive components of the apparatus while the expendable assemblage comprises the photographic materials expended in making documents and some of the less expensive components of the apparatus and is designed to be introduced into and assembled with the permanent assemblage to form a complete, operable document-copying apparatus.

The permanent assemblage comprises a housing including an upper section 14 and a lower section 16 pivoted with respect to one another between the closed or operative position shown in FIG. 2 and the open position shown in FIG. 3 to permit loading of the expendable assemblage into the housing. The lower housing section includes a lower wall 18 with upstanding side walls 20 and 22 and an end wall 23, the opposite ends of the side walls being joined by a transverse member 24 coperating with the side and lower walls to form an opening through which originals may be introduced into and withdrawn from the apparatus. The upper section of the housing includes an upper wall 26, relatively short dependent side walls 28 and a short dependent end wall 30 pivotally secured to end wall 23. Upper housing section 14 includes an enlarged end portion extending above upper wall 26 and including an upper wall 32, side walls 34 and end walls 36 and 38 cooperating to provide a chamber extending above the lower housing section. Upper wall 26 is provided with a rectangular opening 40 through which copies of documents may be withdrawn from the apparatus and a door 42 is pivotally mounted on upper wall 26 for closing opening 40 and providing access through the opening to the interior of the housing. A latching device 44 is provided for retaining door 42 in a closed position while another latching device (not shown) is provided for retaining upper housing section 14 in the closed position shown in FIG. 2.

The expendable assemblage comprises a support or chassis including a pair of side members 46 and 48 joined to one another by a transverse member 50 in the form of a generally flat plate. Transverse member 50 and side members 46 and 48 may be formed of a single sheet of material such as metal and one end section 52 of transverse member 50 is curved downwardly and back upon itself to form a guide for sheet materials in a manner to be described. Expendable assemblage 12 is designed to fit within the housing of assemblage 10 with side members 46 and 48 disposed adjacent side walls 20 and 22, end section 52 located adjacent wall 23, and transverse member 50 disposed adjacent upper wall 26 underlying opening 40. Transverse member 50 cooperates with the housing of the permanent assemblage to divide the housing into an upper or processing chamber between transverse member 50 and upper wall 26 and door 42 and a lower chamber underlying transverse member 50 between the latter and lower wall 18. Side members 46 and 48 include extensions 56 extending above and beyond the end edge of transverse member 50 furthest from end section 52 and located within the portion of upper housing section 14 comprising upper wall 32, side walls 34, and end walls 36 and 38.

The expendable assemblage includes supplies of a photosensitive image-recording sheet 58, a second or image-receiving sheet 60, and means for holding the supplies of the sheets. The image-recording sheet is coiled on a conventional spool 62 pivotally mounted at its ends on side members 46 and 48 underlying the end portion of transverse member 50 furthest from end section 52 thereof. Image-receiving sheet 60 is supplied on a spool 64 pivotally mounted at its ends between extensions 56 of side members 46 and 48.

The expendable assemblage also includes a source of illumination for exposing the image-recording sheet, guide members for guiding the image-recording sheet past the source of illumination during exposure, one of a pair of pressure-applying members for superposing the sheets and distributing a processing liquid therebetween and a take-up member for coiling the two sheets following processing thereof to advance the sheets through the apparatus. The light source comprises an elongated elecro-luminescent panel 66 having a generally cylindrical (partial) cross-section and mounted at its ends on side members 46 and 48 near the ends thereof furthest from end section 52 of transverse member 50. Electroluminescent panel 66 is of a conventional type and is electrically coupled to a source of power through contacts in the form of buttons 68 mounted on side members 46 and 48 in position to be engaged by spring contacts 70 mounted on side walls 20 of lower housing section 16. Panel 66 is mounted on side members 46 and 48 with the concave (cylindrical) side of the panel facing away from spool 62 of image-recording sheet 58.

Means are provided for guiding sheet 58 from spool 62 past panel 66 and in the form shown comprise a pair of guide rolls 72 and 74 pivotally mounted, respectively, above and below panel 66 on side members 46 and 48. The exposed image-recording sheet is superposed with the second sheet and a processing liquid is distributed between the sheets by advancing the sheets into superposition between a pair of pressure-applying members. One of these members in the form of a pressure roll 76 is mounted for rotation at its ends on side members 46 and 48 between guide rolls 72 and the end of transverse member 50 furthest from end section 52 thereof. Image-recording sheet 58 extends from spool 62 around guide rolls 74 past panel 66 to guide roll 72 and thence into superposition with second sheet 60 in the vicinity of pressure roll 76 with a section of sheet 58 being supported between rolls 72 and 74 in juxtaposition with the concave side panel 66. The expendable assemblage includes a take-up member for advancing the photosensitive and image-receiving sheets through the apparatus comprising a spool 78 mounted for rotation at its ends on side members 46 and 48 adjacent end section 52. The expendable assemblage is supplied with the image-recording and second sheets, or at least leaders attached thereto, coupled to one another near pressure roll 76 and to a leader 80 which extends across transverse member 50 around end section 52 to spool 78 to which leader 80 is attached. A guide roll 82 is provided supported on extensions 56 of side members 46 and 48 between spool 64 and pressure roll 76 for guiding image-receiving sheet 60 from spool 64 to pressure roll 76. The leading end portion of image-recording sheet 58 including at least the outermost convolution thereof on spool 62 preferably comprises a light-impermeable material for preventing exposure of the remainder of the image-recording sheet by ambient light prior to loading of the expendable assemblage into the nonexpendable assemblage.

Means are provided for preventing exposure of the image-recording sheet coiled on spool 62 by light from electroluminescent panel 66 and/or by light admitted to the housing through opening 40, comprising a pair of panels 81 and 83 dependent from transverse member 50 located on opposite sides of spool 62 and secured at their ends to side members 46 and 48. Panel 83 extends downwardly to lower wall 18 and functions to separate the section of the housing underlying transverse member 50 into two chambers, one containing spool 62 and the other containing take-up spool 78. Panel 81 extends from transverse member 50 downwardly at an angle to a point closely adjacent guide roll 74 and effectively cooperates to separate the end portion of the housing from the chamber containing spool 62.

Image-recording sheet 58 comprises a photosensitive material such as a gelatino silver halide emulsion carried on a support sheet such as paper and has a width at least equal to the widest original which the apparatus is designed to copy, e.g., 8½ inches. The second or image-receiving sheet 60 is the same width and comprises a support such as paper for a positive transfer image formed, for example, by silver halide diffusion-transfer reversal. The process performed by the apparatus is a substantially dry process in that the liquid is confined by the sheets and does not contact any of the components of the apparatus. The processing liquid is preferably quite viscous and it is distributed between and in contact with a superposed area of the image-recording sheet and a corresponding area of the second sheet superposed therewith by advancement of the two sheets in superposition between a pair of juxtaposed pressure-applying members. The processing liquid for each exposed area of the photosensitive sheet is initially supplied in a tubular straw-shaped container of the type shown and described in U.S. Patent No. 3,047,387, issued July 31, 1962 in the name of Edwin H. Land, and is dispensed from the container onto the image-recording sheet as an elongated mass extending across the sheet adjacent the leading edges of the exposed area. The image-recording sheet including the mass of liquid is then advanced into superposition with the second sheet between the pressure-applying members for distributing the processing liquid from the mass between the sheets in contact with the sheets toward the trailing edges of the exposed area laminating the sheets together to form a sandwich.

One of the pressure-applying members, i.e., roll 76, comprises a component of the expendable assemblage and the other pressure-applying member comprises a component of the nonexpendable assemblage. This other pressure-applying member comprises a support member 84 including an elongated base 86 having dependent lips 88 cooperating to define a channel in which is engaged a pressure plate 90. Pressure plate 90 is at least equal in length to pressure roll 76 and the width of the sheets and is formed of a relatively flexible material such as sheet metal coated on one side with a material, such as an organic plastic, having a relatively low coefficient of friction. Lips 88 turn inwardly toward one another to retain pressure plate 90 within the channel between the lips while the pressure plate is biased outwardly away from base 86 by a plurality of springs 92 engaged in recesses 93 in base 86. Support member 84 is mounted within the upper section of the housing adjacent end wall 38 with pressure plate 90 in juxtaposition with pressure roll 76, and springs 92 function to urge pressure plate 90 toward pressure roll 76 to apply compressive pressure to portions of the sheets engaged between the roll and plate. A multiplicity of uniformly spaced and substantially identical springs 92 are provided for exerting a substantially uniformly distributed biasing force to the pressure plate throughout its length. The pressure plate is substantially more flexible and less rigid than pressure roll 76 so that the pressure plate can conform to roll 76 despite a distortion thereof during fluid distributing operations, while applying a uniformly distributed force to the sheet tending to uniformly distribute the processing liquid therebetween. Pressure roll 76 is preferably cylindrical and plate 90 in its undeformed condition is substantially flat so that the plate and roll cooperate to define a convergent passage into and through which the sheets are advanced for distributing the processing liquid therebetween.

Figure 12:
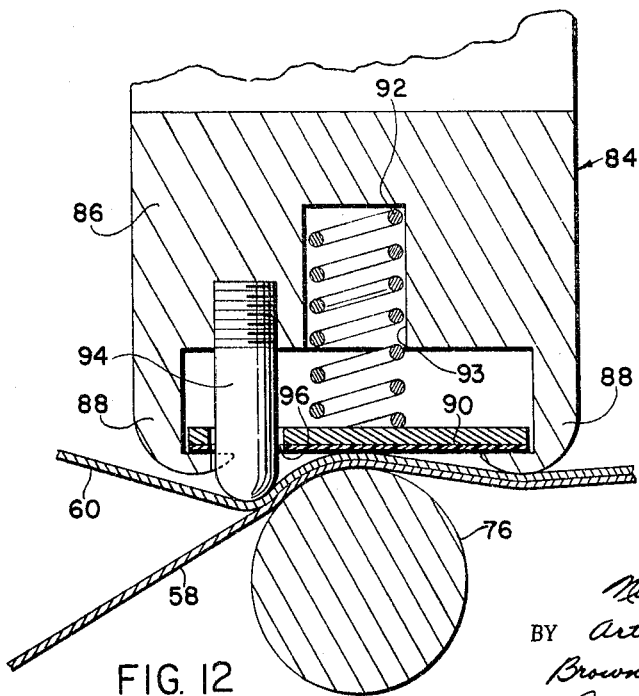
FIG. 12 is a sectional view of components of the apparatus.

The processing liquid is distributed between and in contact with the sheets from a mass which remains substantially stationary with respect to the pressure-applying members in the convergent portion of the passage therebetween. Means are provided for preventing escape of the processing liquid from between the lateral edges of the sheets as the sheets are advanced through the gap between the pressure-applying members, comprising (see FIG. 12) a pair of pins 94 mounted on base 86 near the ends of support member 84 and pressure member 90 and having end sections projecting through openings 96 in pressure plate 90 adjacent the lip 88 closest guide roll 82. The end sections of pins 94 are preferably spherical and extend into the convergent passage between pressure member 90 and pressure roll 76 in advance of the narrowest portion of the gap therebetween into position for engaging the lateral marginal portions of second sheet 60 and deforming portions of the second sheet toward the image-recording sheet. Pins 94 press the two sheets together adjacent their margins slightly in advance of the location (a line) at which pressure is exerted on the sheets by pressure roll 76 and pressure member 90 to distribute the processing liquid and thereby effectively prevent lateral spread of the mass of liquid to and beyond the lateral edges of the sheets.

The quantity of the processing liquid supplied to the sheets for processing each exposed area of the image-recording sheet is usually such that a quantity of the liquid remains between the sheets in a mass located within the convergent passage between the pressure-applying members after the liquid has been distributed in contact with the area to be treated. The apparatus includes means for preventing this liquid from being further distributed into contact with the next successive exposed area of the image-recording sheet. These means include means for spacing pressure plate 90 apart from pressure roll 76 during the terminal portion of movement of the sheets between the plate and roll in order to terminate further distribution of the liquid and collect and retain it between the sheets. These means include a shaft 98 mounted for rotation at its ends on side walls 34 above base 86. A pair of eccentrics 100 are keyed to the shaft and mounted for rotation in a pair of upstanding supports 102 mounted on the ends of support member 84 so that rotation of shaft 98 is effective to move support member 84 toward and away from pressure roll 76. Support member 84 is mounted on shaft 98 and is constrained for linear movement toward and away from roll 76 by studs 104 mounted on side walls 34 and engaged in channels 106 in the ends of base 86. Shaft 98 is preferably biased by a spring into the operative position shown in FIG. 2 to retain support member 84 in the operative or pressure-applying position shown in FIGS. 2, 9 and 12 and means are provided for rotating shaft 98 from the operative position to displace support member 84 and pressure plate 90 away from pressure roll 76 to an inoperative or liquid-collecting position shown in FIG. 10. In the form shown, both the resilient means and the means for rotating shaft 98 comprise a rotary solenoid 108 provided as a component of the permanent assemblage mounted on lower wall 18 between panel 83 and take-up spool 78 and coupled with shaft 98 through a suitable transmission such as shaft 110 and bevel gears 112. One of bevel gears 112 is mounted on a vertical shaft 110 extending upwardly from the lower housing section into the upper portion of the housing into position to mesh with a bevel gear 112 on shaft 98 when the upper housing section is in its closed or operative position. The transmission is designed to fit between side walls 22 and 48 and is mounted on side wall 22 with side wall 48 being provided with a notch 114 through which a component (shaft) of the transmission extends into the space between the side walls.

The image-recording and second sheets are advanced between the pressure-applying members and the sandwich thus formed is advanced into the space between upper wall 26 and door 32 and transverse member 50 by rotation of roll 78 until a portion of the sandwich including the exposed area of the image-recording sheet is located underlying opening 40. The sheets comprising the sandwich are permitted to remain in superposition for a predetermined processing period during which a positive transfer image is formed in the area of the image-receiving sheet superpositioned with the exposed area of the image-recording sheet. Door 42 is then opened and the copy comprising the aforesaid area of the image-receiving sheet is separated from the image-recording sheet. To facilitate separation of the copy, the image-recording sheet is provided with a succession of tear strips such as described in detail in the copending U.S. patent application of Donald D. Casavant et al. Serial No. 246,471, filed December 21, 1962. These tear strips are located adjacent the leading edges of each area of the image-receiving sheet in which a positive transfer image is formed and facilitate tearing of the image-receiving sheet transversely at the leading edges of the print areas. As a portion of the image-receiving sheet is being torn transversely adjacent the leading edges of a copy, the portion of the sheet is also stripped from the image-recording sheet and, thereafter, torn at its trailing edge against a knife 116 provided between upper wall 26 and transverse member 50 adjacent the end of opening 40 closest the pressure-applying members.

Figure 13:
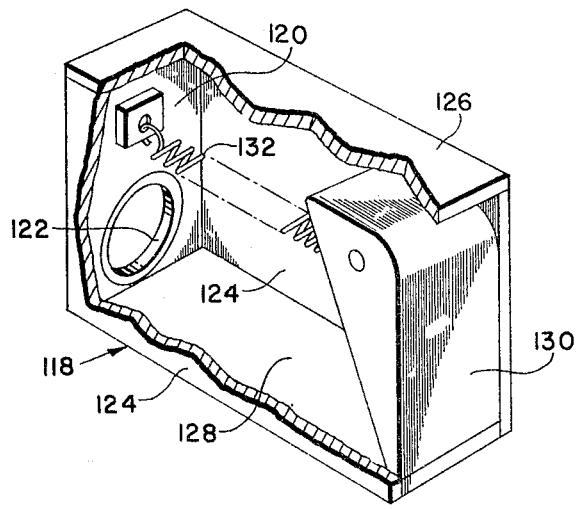
FIG. 13 is a perspective view, partially in section, showing other components of the apparatus.

As previously noted the processing liquid for each exposed area of the image-recording sheet is supplied in an elongated tubular container very much like a drinking straw and sealed at its ends with one (trailing) end seal designed to become unsealed to provide a mouth through which the liquid is discharged in response to the progressive application of compressive pressure to the container commencing in the region of its other (leading) end. When it is desired to process an exposed area of the image-recording sheet, a container is introduced, trailing end first, into the housing through an openning in side wall 20 until the container is located adjacent and above a portion of the image-recording sheet intermediate guide roll 72 and pressure roll 76. The container is then withdrawn through the same opening across the image-recording sheet while compressive pressure is applied to the container to eject its liquid contents through a mouth at the trailing end. The apparatus includes a device, designated 118 in FIG. 13, for compressing the container to eject its liquid contents and for preventing admission of light into the housing through the opening through which the container is introduced and withdrawn. Device 118 is mounted on side wall 20 and includes a frame having a base 120 at which the device is mounted on side wall 20, base 120 being provided with an opening 122 aligned with the opening (not shown) in side wall 20 through which the containers are introduced and withdrawn. Secured to and extending inwardly from base 120 are a pair of lateral walls 124 spaced from one another by a distance slightly greater than the outer diameter of a container and an upper wall 126 and lower wall 128 joined to the base and to the lateral walls to form a tube having a generally rectangular section. A pressure member 130 is pivotally mounted on and between lateral walls 124 adjacent upper wall 126 in closing relation to the tube formed by the lateral upper and lower walls. Pressure member 130 is pivotable so that the portion thereof closest lower wall 128 is movable between a position adjacent the wall inwardly to a position shown in FIG. 13 in response to engagement with a container introduced into the housing through opening 122. A spring 132 secured between base 120 and pressure member 130 is provided for urging the pressure member into the closed position shown at which light is prevented from entering the housing through opening 122. The construction of pressure member 130 is such that, during withdrawal movement of the straw, the pressure member tends to pivot (in a clockwise direction), under the bias of spring 132 and as a result of frictional engagement with the straw, into the closed position engaging and pressing the straw against lower wall 128.

Means are provided for superposing an original document with the image-recording sheet and moving the two sheets in superposition closely adjacent and relative to electroluminescent panel 66 and then separating the original from the image-recording sheet and feeding it from the apparatus. These means comprise a support roll 134 mounted for rotation on side walls 20 and 22 with its periphery closely adjacent the concave surface of panel 66 and tangent with the surfaces of guide rolls 72 and 74 so that the image-recording sheet is engaged between support roll 134 and guide rolls 72 and 74. A portion of the image-recording sheet between the guide rolls is supported for exposure closely adjacent the concave side of panel 66. Support roll 134 is preferably formed of a material such as rubber having a relatively high coefficient of friction so that movement of the image-recording sheet in engagement with support roll 134 causes the support roll to be rotated in a counterclockwise direction.

As a means for feeding original documents into the housing into superposition with the image-recording sheet between guide roll 74 and support roll 134 and from superposition with the image-recording sheet between guide roll 72 and support roll 134 and from the housing, there are provided an enlarged cylindrical feed roll 136 mounted for rotation on side walls 20 and 22 within the opening between lower wall 18 and transverse member 24 with its axis substantially parallel with the axis of support roll 134 and with its periphery closely adjacent a periphery of the support roll. Guide plates 138 and 140 mounted, respectively, below and above feed roll 136 are provided for supporting original documents against the feed roll and guiding the originals into and from the housing in response to rotation of feed roll 136. Guide plate 138 is mounted at its outer edge on lower wall 18 and extends inwardly toward the bite of guide roll 74 and support roll 134 and is biased upwardly against the feed roll. Plate 138 is formed of an opaque sheet material such as metal so that it functions to prevent admission of light into the housing beneath feed roll 136. Guide plate 140 includes an outer edge portion engaged for limited movement in a recess 144 in transverse member 24 and extends inwardly and upwardly around and in engagement with the periphery of roll 136 and thence downwardly toward the bite of guide roll 74 and support roll 134 adjacent the guide roll. The end portions of guide plate 140 are loosely engaged in recesses in side walls 20 and 22 so that the guide plate is supported by feed roll 136 and functions to prevent admission of light into the housing above the feed roll.

A copy of an original document is produced by introducing the original into the housing between feed roll 136 and guide plate 138 and then rotating the feed roll to advance the document into superposition with the image-recording sheet between the sheet and support roll 134 at the bite of the support roll and guide roll 74. Feed roll 136 is rotated by sheaves 146 and 148 provided on, respectively, support roll 134 and feed roll 136 and coupled by a conventional O-ring 150 so that rotation of support roll 134 by frictional engagement with recording sheet 58 is effective to rotate feed roll 136 in the same direction to feed the leading edges of the original into engagement with and between the image-recording sheet and support roll. As the leading edge of the original emerges from between the image-recording sheet and support roll 134 at the bite of the support roll and guide roll 72, it is advanced into engagement with the feed roll 136 between the feed roll and guide plate 140 and advanced by the feed roll from the apparatus. A support plate 152 is provided mounted at its ends on and between side walls 20 and 22 adjacent transverse member 24 and guide plate 140 for supporting the leading edge portion of the original as it emerges from the housing between the guide plate and feed roll to insure that the leading end of the original is not carried around the feed roll and back into the housing between the feed roll and guide plate 138.

The apparatus includes drive means in the form of a constant speed electric motor 154 for rotating spool 78 to advance the sheets through the apparatus. Spool 78 is driven through a transmission including a spur gear 156 located between side walls 48 and 22 and adapted to mesh with a spur gear 158 coupled with spool 78 and comprising a component of the expendable assemblage. Spool 78 is rotated to coil the processed image-recording sheet and sections of the image-receiving sheet located intermediate copies and including any liquid collected at the trailing end of each copy. Motor 154 is designed to operate at a constant speed so that the rate of advancement of the image-recording sheet past electroluminescent panel 66 during exposure to light from the panel is dependent upon the diameter of the coil on spool 78 during the exposure. This diameter, of course, increases as successive copies are made so that the rate of movement of the sheets increases with successive copies and would result in a shorter exposure for successive copies if the brightness of the light source were maintained constant. In order to provide for uniform exposure for successive copies, the apparatus includes means for varying the light from the sources allowed to expose the image-recording sheet in direct proportion to the diameter of the coil of sheet material on spool 78.

The apparatus includes means for determining the diameter of the coil on spool 78 and operating the brightness control, e.g., variable resistor, so as to maintain constant the exposure given successive areas of the image-recording sheets. The diameter of the coil on spool 78 is determined by measuring the diameter of the coil of image-receiving sheet 60 on spool 64, since the diameters of the two coils bear a fixed inverse relation. The means for determining the diameter of the coil on spool 78 by sensing the diameter of the coil on spool 64 performs the additional function of indicating to the user of the apparatus the amount of unused materials remaining in the apparatus at any time.

The diameter of the coil of spool 64 is sensed by a device 160, shown in detail in FIGS. 5 and 6, mounted on upper wall 32 and including a channel-shaped frame 162 having a base 164 at which the frame is mounted on upper wall 32 and two dependent side walls 166 having parallel slots 168 including portions extending substantially parallel with base 164 and curved portions extending downwardly toward the lower section of the housing. The device includes an elongated rod 170 engaged in the curved portions of the slots for engaging the coil of sheet 60 on spool 64. Rod 170 is movable downwardly (and to the right, viewing FIG. 5) in the curved portions of the slots and is coupled with a second shaft 172 by a plate 174 secured to the lower side of rod 170, shaft 172 being engaged for linear movement in the straight or horizontal portions of slots 168. Rod 170 and shaft 172 are biased by a spring 176 toward the right urging rod 170 toward the lower, right end of the curved portions of slots 168, that is downwardly toward spool 64 into engagement with sheet 60 coiled on the spool. By virtue of this construction the location of shaft 172 is a function of the diameter of the coil of sheet 60, and to provide an indication to the operator of the amount of sheet material remaining in the apparatus, shaft 172 is coupled with an indicator 178, visible through a window 180 in upper wall 32, by a connecting rod 182 engaged in a channel-shaped recess (not shown) in the inside of wall 32.

Device 160 is constructed so that rod 170 is relatively free to move downwardly (to the right) within slots 168 toward spool 64 under the bias of spring 176 as the diameter of the coil of sheet 60 on spool 64 decreases; however, the construction is such that an upward pressure on rod 170 will tend to bend the rod rather than move it within slots 168. Thus, when the materials with which the apparatus is loaded are exhausted, rod 170 will be located at the extreme lower ends of slots 168 and in this position is subject to being bent upon closure of the housing after loading of a new expendable assemblage including full coil of sheet 60 when the upper housing section is moved into its closed position. Accordingly, means are provided for returning rod 170 to an initial position shown in FIG. 5 at which the rod is engaged at the beginning, i.e., uppermost portions, of the curved portions of slots 168, and shaft 172 to its initial position at the extreme left end of the straight portions of the slots; and retaining the rod and shaft in their initial positions against the bias of spring 176 until the upper housing section is again pivoted into a closed position. These last-mentioned means comprise a lever 184 mounted on the outer end of a shaft 186 journalled in side wall 34 and extending through the side wall to the inside of the housing where the shaft is connected with a lever 188 in the form of a sector. Shaft 172 is coupled with lever 188 by a flexible connecting member such as a wire 190 extending around a spindle 192 and levers 184 and 188 are biased, in a counterclockwise direction viewing FIG. 5, by a torsion spring 194 which is stronger than spring 176 and functions to return rod 170 and shaft 172 to the initial positions shown in which lever 184 extends downwardly beyond the lower edge of side wall 34. Lever 184 is mounted in a recess in the side wall so that when the upper housing section is closed, the lever is engaged by side wall 20 of the lower housing section pivoting the lever in a clockwise direction against the bias of torsion spring 194 to the position shown in broken lines in FIG. 5, thereby leaving rod 170 and shaft 172 free to move under the bias of spring 176. In an alternative arrangement, a member may be provided on lower side wall 20 for engaging and pivoting lever 184 during closure movement of the upper housing section.

A latch is provided for retaining rod 170 and shaft 172 in their initial positions until the upper housing section has been pivoted substantially all the way into its closed or operative position whereupon the latch is released to allow rod 170 to move into engagement with the coil of second sheet 60 on spool 64. This latch comprises a latch plate 196 pivotally mounted intermediate its ends on and between side wall 166 beneath connecting plate 174. One end section, designated 198, of latch plate 196 is turned upwardly to engage rod 170 when the rod is in its initial position and a counterweight 200 is mounted on the other end section of latch plate 196 for pivoting the latch plate in a counterclockwise direction viewing FIG. 6 to urge end section 198 upwardly into engagement with rod 170. Counterweight 200 is positioned so as to engage the coil of sheet 60 on spool 64 when the upper housing section is pivoted into closed position, thereby pivoting latch plate 196 from engagement with rod 170 allowing the rod to move into engagement with sheet 60. When end section 198 of latch plate 196 is not engaged with rod 170, it may bear against the underside of plate 174.

The brightness of the electroluminescent panel is varied by a rheostat 202 coupled with a manually engageable knob 204 mounted on upper wall 32. The knob permits the operator to vary the exposure to conform to the requirements of various original documents in order to obtain a copy of a desired character (e.g., dark or light). The rheostat may be coupled directly with connecting rod 182 so that it is varied automatically to produce uniform exposures for successive copies or, in an alternative embodiment, adjustment of the rheostat to provide for uniform exposures is a manual operation. This latter embodiment is shown in FIG. 5 in which connecting rod 182 is provided with indicator 178. A plate 206 is slidably mounted on the inside of wall 32 underlying window 180 and is provided with indicia visible through the window and indicating various settings of the rheostat which is coupled to plate 206 through a gear 208 and rack 210. The rheostat is set to provide a particular exposure designated by one of the indicia by turning knob 204 to bring the particular indicia into alignment with indicator 178. In this embodiment the operator manually resets the indicia representing the desired exposure in alignment with indicator 178 for successive exposures as the indicator moves from one side of window 180 to the other as the materials embodied in the apparatus are expended and the diameter of the coil on spool 78 increases.

Figure 7:
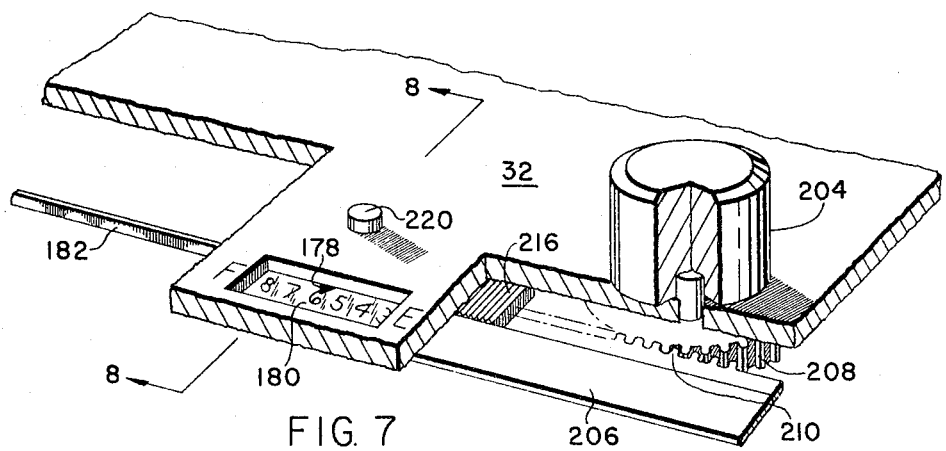
FIG. 7 is a fragmentary perspective view to FIG. 5 showing another embodiment of the invention.
Figure 8:
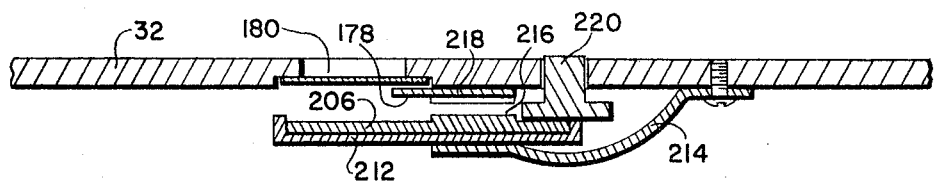
FIG. 8 is a sectional view taken substantially along the line 8—8 of FIG. 7.

Another embodiment of the control system is illustrated in FIGS. 7 and 8 in which the operator selects the desired exposure by aligning one of the indicia on plate 206 with indicator 178 and then couples plate 206 and hence the rheostat, with connecting rod 182 so that movement of the connecting rod automatically adjusts the rheostat to give the selected exposure for successive copies. In this embodiment plate 206 is mounted for limited movement toward and away from wall 32 on a support member 212. Plate 206 is provided with a serrated section 216 adapted to engage a similarly serrated member 218 coupled with or comprising a portion of indicator 178 and/or connecting rod 182. Serrations on section 216 and member 218 engage one another and retain the connecting rod at plate 206 in fixed relation. A push button 220 is provided in wall 32 for displacing plate 206 downwardly to disengage the serrations and permit the rheostat to be adjusted without moving indicia 178 to bring any one of the desired indicia into alignment with the indicator. When pressure on the button is released, the serrations then move into engagement locking the control mechanism at the particular setting so that thereafter succeeding exposures will be at that setting and will remain uniform.

Figure 11:
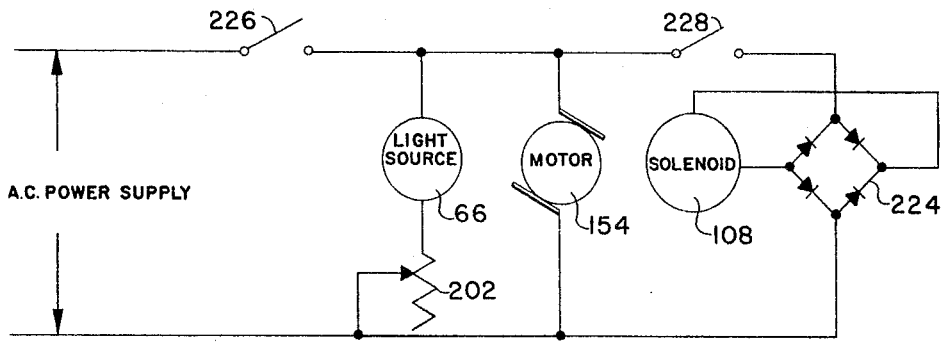
FIG. 11 is an electrical diagram showing the control and operating system of the apparatus.

In accordance with the invention, the apparatus includes means for automatically controlling the advancement of the sheets, i.e., starting and stopping the movement of the sheets, and means for energizing solenoid 108 at the proper instant in order to collect and retain any excess processing liquid. These control means, elements of which are enclosed in a housing 222 mounted on lower wall 18, include a rectifier 224 shown diagrammatically in FIG. 11 for supplying power to operate the solenoid and a pair of microswitches 226 and 228 shown in FIGS. 3, 9 and 10 mounted on support member 84. Microswitch 226 is connected in series with the alternating current power supply to control the flow of current to all of the electrical component of the apparatus including the light source 66, motor 154 and solenoid 108, and microswitch 228 is connected in series with rectifier 224 for controlling the operation of solenoid 108. Switch 226 is biased into an open position and includes an L-shaped actuating lever 230 including a long arm pivotally mounted intermediate its ends and a short arm extending through an opening 232 in pressure plate 90 into the convergent portion of the passage between the pressure plate and pressure roll 176 ahead of the pressure roll. The free end of the short arm of actuating lever 230 is adapted to ride on the surface of second sheet 60 and to be supported thereby retaining switch 226 closed. Sheet 60 is provided with a succession of apertures 234 each located intermediate successive image-receiving areas of the sheet and disposed so as to move into alignment with the short arm of lever 230 so that the arm is dropped through the apertures allowing switch 226 to open thereby discontinuing the flow of current to the entire apparatus and terminating a processing cycle.

At the commencement of a processing cycle the short arm of actuating lever 230 extends into an aperture 234 and switch 226 is open so that solenoid 108 is not energized and pressure plate 90 is in its down or operative position in juxtaposition with pressure roll 76. To initiate a processing cycle, lever 230 is pivoted in a counterclockwise direction to momentarily close switch 226 energizing motor 154 to initiate the advancement of the sheets through the apparatus thereby moving aperture 234 out of alignment with the short arm of lever 230. The means for momentarily closing switch 226 includes a push button 236 projecting from the housing through upper wall 32 where the push button is manually engageable and a connecting rod 238 for engaging the end of lever 230 opposite the short arm and movable into the position shown in FIG. 10 for pivoting the lever to close switch 226. As soon as aperture 234 moves out of alignment with the short arm of lever 230, the push button may be released because sheet 60 will function to support the lever in the pivoted position in which switch 226 is closed.

Figure 9:
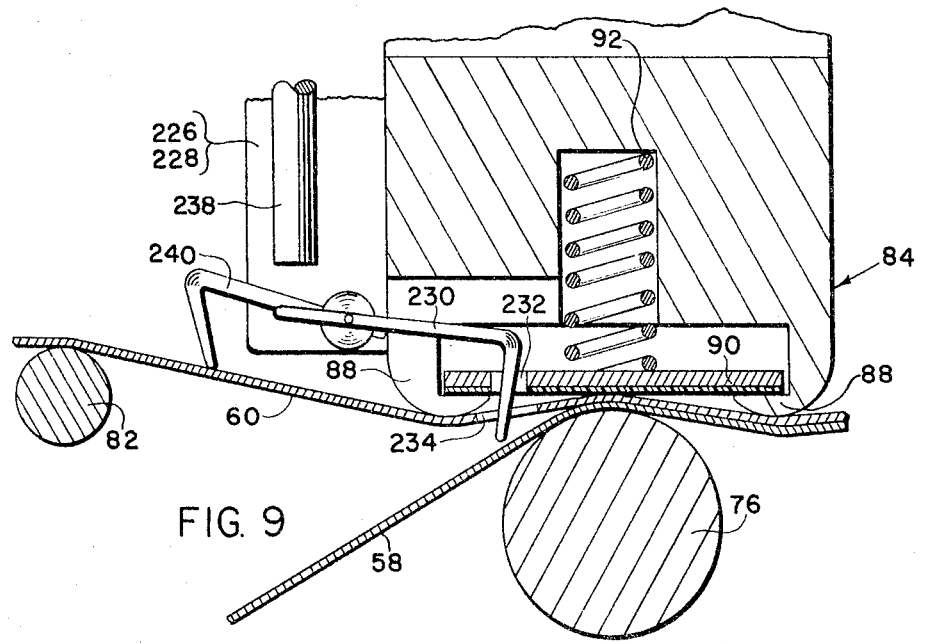
FIGS. 9 and 10 are sectional views of components of the apparatus illustrating the operation thereof.
Figure 10:
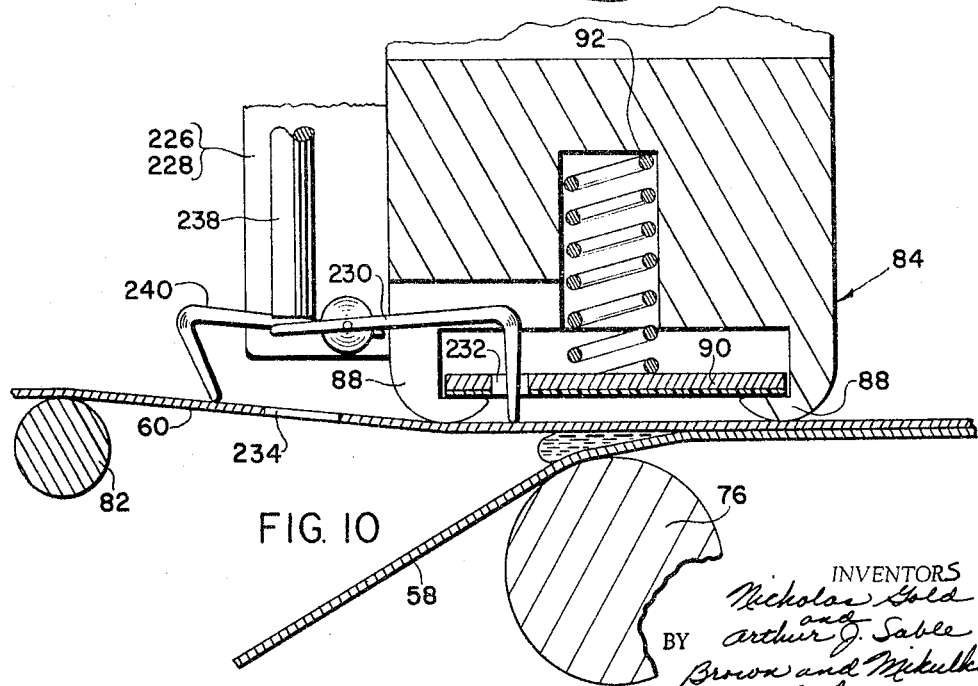

Microswitch 228 controls the operation of solenoid 108 and includes an L-shaped actuating lever 240 pivotally mounted about the same center as lever 230 and including a short arm adapted to ride on the surface of the portion of sheet 60 intermediate guide roll 82 and one of lips 88 of support member 84. Lever 240 is biased in a counterclockwise direction and switch 228 is biased into its closed position and, as shown in FIG. 9, is retained in its opened position by engagement of sheet 60 with lever 240. Just before the end of a processing cycle an aperture 234 in sheet 60 moves into alignment with the short arm of lever 240 which enters the aperture allowing the lever to pivot in a counterclockwise direction closing switch 228 and actuating the solenoid to move support member 84 upwardly to its inoperative position (shown in FIG. 10) in order to collect and retain any processing liquid located between the sheet at the bite of roll 76 and pressure plate 90. As long as the solenoid is energized and support member 84 is in its up position, switch 228 remains closed (as shown in FIG. 10) and switch 226 is held closed by sheet 60 due to the tension thereon until the opening 234 which just actuated switch 228 moves into alignment with the short arm of actuating lever 230 allowing switch 226 to open, stopping motor 154 and deenergizing solenoid 108 so that the support member returns to its initial operative position.

In the operation of the apparatus upper housing section 14 is pivoted to an open position and an expendable assemblage 12 including sheets 58 and 60 coupled near pressure roll 76 to a leader 80 threaded across transverse member 50 and connected to spool 78, is loaded into the lower section of the housing into the position shown in FIGS. 2 and 3 and the upper section of the housing is then pivoted into closed position. When power is supplied to the apparatus motor 154 is automatically actuated to drive spool 78 and advance the sheets through the apparatus until an opening in sheet 60 becomes aligned with the short arm of lever 230 opening switch 226 terminating the operation of motor 154. At this point the apparatus is in condition to commence an exposure and processing cycle to produce a copy of an original document. The leading edge of an original is introduced into the apparatus between guide plate 138 and feed roll 136 and, before commencement of the cycle, a container of processing liquid is introduced into the housing through opening 122 in device 118 and is withdrawn in the opposite direction to deposit the fluid contents of the container onto sheet 58 adjacent guide roll 72.

Push button 236 is then depressed momentarily to close switch 226 and commence the movement of the sheets through the apparatus. The leading edge of the original, designated 242, is advanced by feed roll 136 into engagement with sheet 58 and support roll 134 and advanced together with the photosensitive sheet past electroluminescent panel 66 and into engagement with feed roll 136 between the latter and guide plate 140 and from the housing. Closing of switch 226 also energizes the electroluminescent panel, or other light source to expose the image-recording sheet in superposition with the original. The exposed portion of the image-recording sheet is advanced into superposition with an image-receiving area of image-receiving sheet 60 between pressure roll 76 and pressure plate 90 which cooperate to distribute the processing liquid between the two sheets laminating them together to form a sandwich which is advanced into the chamber underlying door 42 between wall 26 and transverse member 50. Door 42 is then opened and the section of the image-recording sheet containing the processed copy is torn at its leading edge, separated from the image-recording sheet and then torn at its trailing edge against knife 116. During the terminal portion of movement of the sheets, processing liquid is collected between portions of the sheets intermediate the exposed and processed areas of the two sheets and the next successive areas to be exposed and processed. The apparatus then automatically shuts itself off at the end of the operating cycle in readiness for the next operating cycle.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus for exposing successive areas of a photographic image-recording sheet and treating said areas with a processing liquid distributed between said areas and areas of a second sheet superposed therewith, in combination:

first and second pressure-applying members;
means mounting said first pressure-applying member in juxtaposition with said second pressure-applying member and for movement toward and away from said second pressure-applying member, said pressure-applying members cooperating for superposing said sheets and distributing said liquid therebetween during movement of said sheets between said members;
take-up means for moving said sheets through said apparatus between said members;
drive means for moving said first pressure-applying member toward and away from said second pressure-applying member;
first sensing means mounted on said first pressure-applying member and responsive to engagement with a portion of one of said sheets at a location intermediate said pressure-applying members to discontinue the operation of said take-up means and thereby arrest the movement of said sheets through said apparatus;
second sensing means mounted on said first pressure-applying member in advance of said pressure-applying members adjacent the path of movement of said one of said sheets between said members for engaging said portion of said one sheet prior to engagement of said portion by said first sensing means, said second sensing means being responsive to engagement with said portion for actuating said drive means to diplace said first pressure-applying member apart from said second pressure-applying member during the terminal portion of movement of said sheets between said members;

said first sensing means being responsive to engagement with said portion of said one sheet for causing said drive means to move said first pressure-applying member toward said second pressure-applying member.

2. In photographic apparatus for exposing successive areas of a photographic image-recording sheet and treating said areas with a processing liquid distributed between said areas and areas of a second sheet superposed therewith, in combination:

first and second pressure-applying members;

means mounting said first member in juxtaposition with said second member and for movement between a first position closely adjacent said second member and a second position displaced from said second member, said pressure-applying members cooperating for superposing said sheets and distributing said liquid therebetween during movement of said sheets between said members;

means for guiding one of said sheets along a predetermined path into superposition with the other of said sheets between said pressure-applying members;

take-up means for moving said sheets through said apparatus between said pressure-applying members;

drive means for moving said first pressure-applying member between said first and second positions;

control means including a first sensing element mounted on said first pressure-applying member between said pressure-applying members for movement from a first position in which said control means maintain said take-up means operative to move said sheets, toward said second member to a second position at which said control means discontinue the operation of said take-up means and cause said drive means to move said first pressure-applying member from said second to said first position;

said first sensing element being biased into said second position thereof, being so located as to be retained in said first positon thereof by engagement with said one sheet during movement of said one sheet between said members and being movable to said second position through an opening in said one sheet upon movement of said opening into alignement with said first sensing element;

said control means including a second sensing element mounted on said first pressure-applying member adjacent said path of movement of said one sheet for movement between a first position in which said control means render said drive means operative to retain said first pressure-applying member in said first position and toward said one sheet to a second position in which said control means render said drive means operative to move said first pressure-applying member to said second postion;

said second sensing element being biased toward said sheet into said second position and being so located as to be retained in said first position by engagement with said sheet when said first member is in said first position, and being movable through said opening in said one sheet into said second position;

3. In photographic apparatus for exposing successive areas of a photographic image-recording sheet and treating said areas with a processing liquid distributed between said areas and areas of a second sheet superposed therewith, in combination:

first and second pressure-applying members;

first means mounting said first member in juxtaposition with said second member and for movement between an operative position adjacent said second member at which said members cooperate to apply compressive pressure to said sheets to distribute said liquid therebetween during movement of said sheets between said members, and a retracted position apart from said second member at which pressure on said sheets is relieved;

take-up means for moving said sheets through said apparatus between said pressure-applying members;

control means for operating said first means to move said firt member between said operative and retracted positions and initiating and terminating the operation of said take-up means;

said control means including a first element mounted on said first pressure-applying member in position to engage one of said sheets between said pressure-applying members;

said first element being mounted for movement relative to said first member and said one sheet toward and away from said second member between a first position in which said control means maintain said take-up member operative to move said sheets and a second position in which said control means terminate the operation of said take-up means and operate said first means to return said first pressure-applying member from said displaced to said operative position;

said first element being biased into said second position and being mounted for engaging said one sheet so as to be retained thereby in said first position during movement of said one sheet until an opening in said one sheet becomes aligned with said first element allowing said first element to move into said second position thereof;

said control means including a second element mounted on said first member in position to engage said one sheet in advance of said first element, said second element being mounted for movement relative to said one sheet and said first member in the same general direction as said first member between a first position at which said control means operate said first means to locate said first member in said operative position and a second position at which said control means operate said first means to move said first member to said retracted position, said second element being biased toward said one sheet into said second position thereof and being positioned to be retained in said first position by engagement with said one sheet when said first member is in said operative position until said opening in said one sheet moves into alignment with said second element allowing said second element to move through said opening into said second position.

4. A photographic apparatus of claim 3 in which said first means and said take-up means include electrically operated drive means and said control means comprise a first switch operated by said first element and a second switch operated by said second element, said second switch controls the flow of current to said first means and said first switch controls the flow of current to said second switch and said take-up means.

5. The photographic apparatus of claim 4 in which said take-up means include an electric motor electrically connected in series with said first switch and in parallel with said second switch and said first means includes means for biasing said first member into said operative position and electromagnetic means coupled in series with said first and second switches for moving said first member into said retracted position.

6. The photographic apparatus of claim 4 in which manually operable means are provided for closing said switch at least momentarily to initiate an operating cycle of said apparatus.

7. The photographic apparatus of claim 6 in which said manually operable means move said first element from said second to said first position thereof.

8. The photographic apparatus of claim 3 in which said first means include means for biasing said first member into said operative position and electromagnetic means for moving said first member into said retracted position and said control means include a first switch operated by said first element and a second switch operated by said second element and said switches are connected in series with said electromagnetic means for controlling the operation thereof.

9. The photographic apparatus of claim 8 in which said electromagnetic means comprise a solenoid.

10. In photographic apparatus for exposing successive areas of a photographic image-recording sheet and treating said areas with a processing liquid distributed between said areas and areas of a second sheet superposed therewith, in combination:
  a first pressure-applying member;
  a second pressure-applying member mounted in juxtaposition with said first pressure-applying member for movement between a first position closely adjacent said first member at which said members cooperate to apply compressive pressure to said sheets to distribute said liquid therebetween during movement of said sheets between said members and a second position apart from said first member at which pressure upon said sheets is relieved;
  take-up means including an electric motor for moving said sheets through said apparatus between said pressure-applying members;
  resilient means for biasing said second member into said first position;
  electromagnetic means for moving said second member from said first to said second position;
  a first switch connected in series with said motor and including a first actuating element mounted on said second member for contacting one of said sheets between said pressure-applying member so that said first switch is held closed by said one sheet until an opening therein becomes aligned with said actuating element allowing said element to move into said opening and open said switch; and
  a second switch connected in series with said electromagnetic means and said first switch and in parallel with said motor and including a second actuating element mounted on said second pressure-applying member for contacting said one sheet ahead of said first actuating element so that said second switch is held open by said one sheet when said second member is in said first position until said opening becomes aligned with said second element allowing said element to move into said opening and close said second switch.

References Cited by the Examiner
UNITED STATES PATENTS
3,147,684  9/1964  Gold _____ 95—75

JOHN M. HORAN, *Primary Examiner.*